(12) United States Patent
Lewis

(10) Patent No.: US 7,487,927 B2
(45) Date of Patent: Feb. 10, 2009

(54) FERTILIZING SYSTEM AND METHOD BY EXTRACTING NITROGEN COMPOUNDS FROM COMBUSTION EXHAUST GASES

(76) Inventor: Gary Lewis, Box 2410, Pincher Creek, Albera (CA) T0K 1W0

(*) Notice: Subject to any disclaimer, the term of this patent is extended or adjusted under 35 U.S.C. 154(b) by 675 days.

(21) Appl. No.: 10/533,089
(22) PCT Filed: Oct. 28, 2003
(86) PCT No.: PCT/CA03/01649
§ 371 (c)(1),
(2), (4) Date: Apr. 28, 2005
(87) PCT Pub. No.: WO2004/039479
PCT Pub. Date: May 13, 2004

(65) Prior Publication Data
US 2006/0010947 A1    Jan. 19, 2006

(30) Foreign Application Priority Data
Oct. 29, 2002  (CA) .................................... 2409883

(51) Int. Cl.
B05B 3/00 (2006.01)
B05B 3/18 (2006.01)
B01D 53/54 (2006.01)
B01D 53/56 (2006.01)
C05D 9/00 (2006.01)
C05D 9/02 (2006.01)

(52) U.S. Cl. ................. 239/723; 71/31; 71/32; 71/54; 71/56; 71/57; 71/58; 239/726; 239/735; 239/744; 422/177

(58) Field of Classification Search ................. 239/723, 239/744, 735, 726; 71/31, 32, 54, 56, 57, 71/58; 422/177
See application file for complete search history.

(56) References Cited

U.S. PATENT DOCUMENTS

| 4,133,671 A | 1/1979 | Mikel |
| 4,247,321 A | 1/1981 | Persinger |

FOREIGN PATENT DOCUMENTS

| FR | 2 659 249 | 9/1990 |
| GB | 2 068 259 | 1/1981 |
| GB | 2 344 544 | 9/1998 |

Primary Examiner—Wayne Langel
(74) Attorney, Agent, or Firm—Ade & Company Inc; Ryan W. Dupuis; Kyle R. Satterthwaite

(57) ABSTRACT

A fertilizer system is provided using extraction of nitrogen compounds and other plant nutrients from combustion exhaust gases, and which is particularly suited for use with an agricultural irrigation system or engine driven plant care equipment including self-propelled tractors, mowers and the like. The system includes an exhaust chamber in communication with the motor driving a pump of the system for receiving the exhaust gases therethrough. Water is injected into the exhaust chamber for mixing with the exhaust so that the steam being formed absorbs various nitrogen compounds and other plant nutrients from the surrounding hot exhaust gases. The steam is subsequently condensed in a condensing chamber from which condensate is collected and dispensed into the inlet of the pump with water circulated therethrough. The water is thus enriched with various nitrogen compounds and other plant nutrients absorbed from the exhaust gases before being dispensed to a planted area by an irrigation system or a sprayer attachment on a self-propelled tractor, mower and the like.

26 Claims, 3 Drawing Sheets

FERTILIZING SYSTEM AND METHOD BY EXTRACTING NITROGEN COMPOUNDS FROM COMBUSTION EXHAUST GASES

This application is a national phase filing of PCT/CA2003/001649 and claims foreign priority benefits from Canadian Patent Application 2,409,883 filed Oct. 29, 2002.

FIELD OF THE INVENTION

The present invention relates to a method and system for fertilizing using extraction of nitrogen compounds and plant nutrients from combustion exhaust gases, and more particularly to such a system or method when used for extracting nitrogen compounds and plant nutrients from exhaust gases, for example, in either an irrigation pump motor of an agricultural irrigation system for subsequent use of the nitrogen compounds in irrigation water of the irrigation system or in a driving motor for driving or propelling plant care equipment including self-propelled tractors, mowers, sprayers and the like.

BACKGROUND

Various nitrogen compounds and plant nutrients are known to be desirable for fertilizing various plants, in particular crops. Repeated adding of fertilizer to crops however can be time consuming and costly to both purchase and distribute to the plants.

While forms of nitrogen are known to exist in large quantities in exhaust gases of combustion engines, these forms of nitrogen however are typically harmful to the environment and of little use as a fertilizer.

U.S. Pat. No. 6,446,385 to Crutcher describes a greenhouse system in which a gas turbine provides heat and power to maintain the greenhouse. An exhaust gas treatment system receives the hot gas from the turbine to remove and convert harmful nitrogen compounds while a fertilization system makes use of the converted nitrogen compounds as fertilizer for feeding the plants of the greenhouse. The method of extraction described refers to European patent application No. 97117779.5. The gas treatment system however requires consumption of an alkaline earth compound to react with nitric acid which is formed to then form an alkaline earth nitrate in an aqueous form. The resulting calcium nitrate or magnesium nitrate which may be produced are harmful to the plants and soil when distributed in excess quantities and accordingly this system would require careful monitoring so that only limited amounts of the fertilizer compound generated by the gas treatment system are in fact distributed to the plants through irrigation thereof in the greenhouse. This method converts $NO_x$ to nitric acid to be scrubbed out with earth alkaline in an aqueous effluent, leaving carbon dioxide in the exhaust stream to raise the carbon dioxide levels in the greenhouse.

SUMMARY

According to one aspect of the present invention there is provided a fertilizer system for extracting nitrogen compounds and other plant nutrients from exhaust gases of a combustion device, the system comprising:

an exhaust chamber having an inlet and an outlet for receiving the exhaust gases from the combustion device there through;

a water injector for injecting water into the exhaust chamber for mixing with the exhaust gases to form a water vapor;

a condensing chamber for condensing said water vapor exiting the exhaust chamber with the exhaust gases to form a condensate solution; and a collector for collecting said condensate solution from the condensing chamber;

characterised in that said condensate solution being formed comprises water and one or more compounds selected from the group including nitrate, nitrite and ammonium. Other useful nutrients to the plants which are extracted include sulphur, phosphorus, magnesium, zinc, iron, copper and carbon dioxide as a carbonic acid.

According to a second aspect of the present invention there is provided a method of fertilizing by extracting nitrogen compounds and other plant nutrients from exhaust gases of a combustion device, the method comprising:

operating a combustion device to produce exhaust gases;

directing the exhaust gases through an exhaust chamber in communication with the combustion device;

injecting water into the exhaust chamber for mixing with the exhaust gases to form a water vapor;

condensing said water vapor exiting the exhaust chamber with the exhaust gases to form a condensate solution comprising water and one or more compounds selected from the group including nitrate, nitrite and ammonium; and collecting said condensate solution from the condensing chamber.

Other useful plant nutrients which may be included in the condensate solution as a result of the above steps include: sulphur, phosphorus, magnesium, zinc, iron, copper and carbon dioxide as a carbonic acid.

According to further aspects of the present invention there are provided fertilizer solutions comprising the condensate solution formed by the system and method noted above.

The use of water and exhaust mixed together and subsequently condensed produces a solution of water with nitrate, nitrite, ammonium, sulphur, phosphorus, magnesium, zinc, iron, copper and carbon dioxide as a carbonic acid. These are useful to plants when watered therewith without concern of being toxic to the plants when left to operate continuously from an irrigation pump motor in an irrigation system for example.

As described in our method of extraction, complete conversion to nitric acid is not required as water will scrub out $NH_4$, $NO_2$, $NO_3$, and other plant nutrients such as sulphur, phosphorus, magnesium, zinc, iron, copper and carbon dioxide as a carbonic acid. This would carry the $CO_2$ to the crop canopy to feed the crop and/or be stored in the soil as a carbon sink. $NO_2$ (nitrite) will feed soil bacteria and nitrite reductase (NiR) which transforms nitrite to ammonia and the nitrate bacteria will change nitrites into nitrates. Sulphur dioxide can be used by the crop canopy. Sulphur converts to sulphate in the soil for root up take when combined with water in which sulphuric acid is formed The use of an exhaust chamber in combination with a water injector permits nitrogen and nutrients to be readily collected from exhaust gases of commonly available combustion devices, including internal combustion engines and the like, at minimal cost and effort as the nitrogen compounds available in the exhaust gases are normally considered useless and therefore typically wasted. Collection of nitrogen compounds and plant nutrients in a condensate is particularly useful in an agricultural irrigation system as compounds are ready for immediate use with little or no effort on the part of the operator of the irrigation system. Further benefits to injecting water into the exhaust chamber for mixing with the irrigation water include preheating the irrigation water with heat from the exhaust gases and reducing undesirable emissions in the exhaust gases due to the mixing of the gases with water vapor in the exhaust chamber.

There may be provided a distribution system for distributing the condensate solution to a planted area, for example in irrigation system or a sprayer attachment on a self-propelled tractor or mower and the like.

The condensate solution may be fully and continuously diverted to the distribution system comprising an irrigation system or a sprayer system on self-propelled equipment as it moves over the crop or area of application.

In a preferred embodiment, only water is added to the exhaust gases to form the condensate solution.

The combustion device may comprise an internal combustion engine, however other devices known to consume fossil fuels to produce products of combustion may be useful in certain instances.

The distribution system in a first embodiment comprises plant care equipment, for example a self-propelled tractor or mower, such that the combustion device comprises an engine driving the plant care equipment.

Alternatively, the distribution system comprises a crop irrigation system, wherein the collector is coupled to communicate with an inlet of an irrigation pump for dispensing the condensate solution into irrigation water passing through the irrigation pump. The combustion device in this instance would comprise a motor driving the irrigation pump.

The water injector may be coupled to an outlet of the irrigation pump whereby the water injected into the exhaust chamber comprises a portion of the water pumped by the irrigation pump.

The condensing chamber may include a condenser core which is cooled by irrigation water passing therethrough or other heat exchanger equipment.

There may be provided a shut-off valve coupled in series between the collector and the distribution system which is arranged to be open only when the distribution system is operating.

The water injector may include a float valve coupled in series therewith, the float valve being supported in the condensing chamber such that the water injector is arranged to inject water into the exhaust chamber in response to a level of condensate in the condensing chamber falling below a prescribed level of condensate.

There may be provided a catalytic converter coupled to an inlet of the exhaust chamber for receiving the exhaust gases therethrough prior to the exhaust chamber. The type of catalyst depends on type of fuel used or desired oxidation.

There may be provided an air pump for injecting air into the exhaust gases near the water injector to assist in converting harmful emissions to more desirable compounds.

There may be provided high voltage arc means for generating an electric arc in a passage through which the exhaust gases pass also to assist in converting harmful emissions to more desirable compounds.

There may be provided an electrical field generator surrounding a passage through which the exhaust gases pass or a portion of water from the injector may be diverted to an electrolysis device before injection into the exhaust gases for injecting hydrogen and oxygen into the exhaust gases to further promote conversion of harmful emissions to more desirable compounds.

BRIEF DESCRIPTION OF THE DRAWINGS

In the accompanying drawings, which illustrate exemplary embodiments of the present invention.

DETAILED DESCRIPTION

Figure 1:
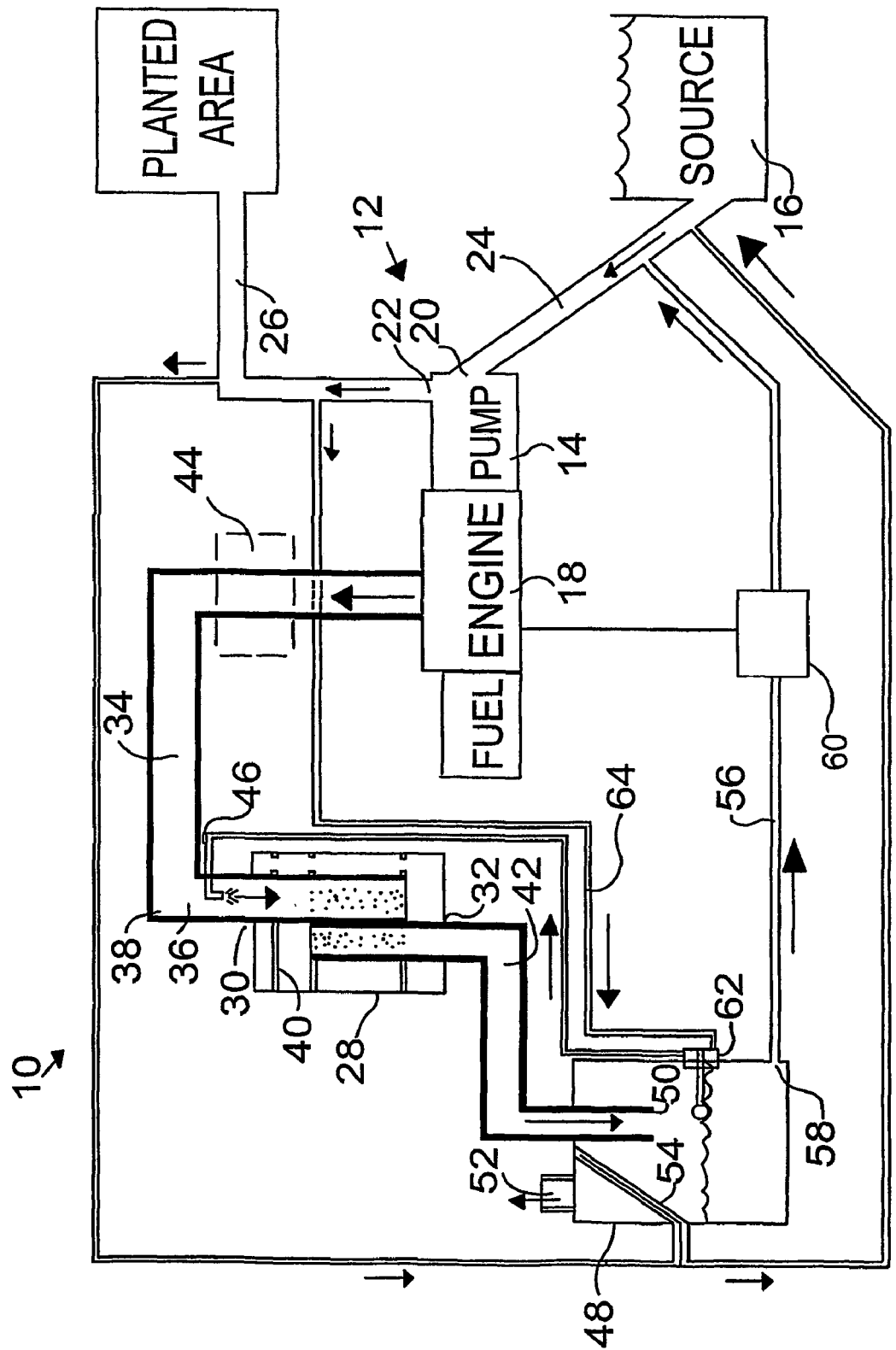
FIG. 1 is a schematic view of the fertilizer system for extraction of nitrogen compounds and other plant nutrients as it is used in an irrigation system.
Figure 2:
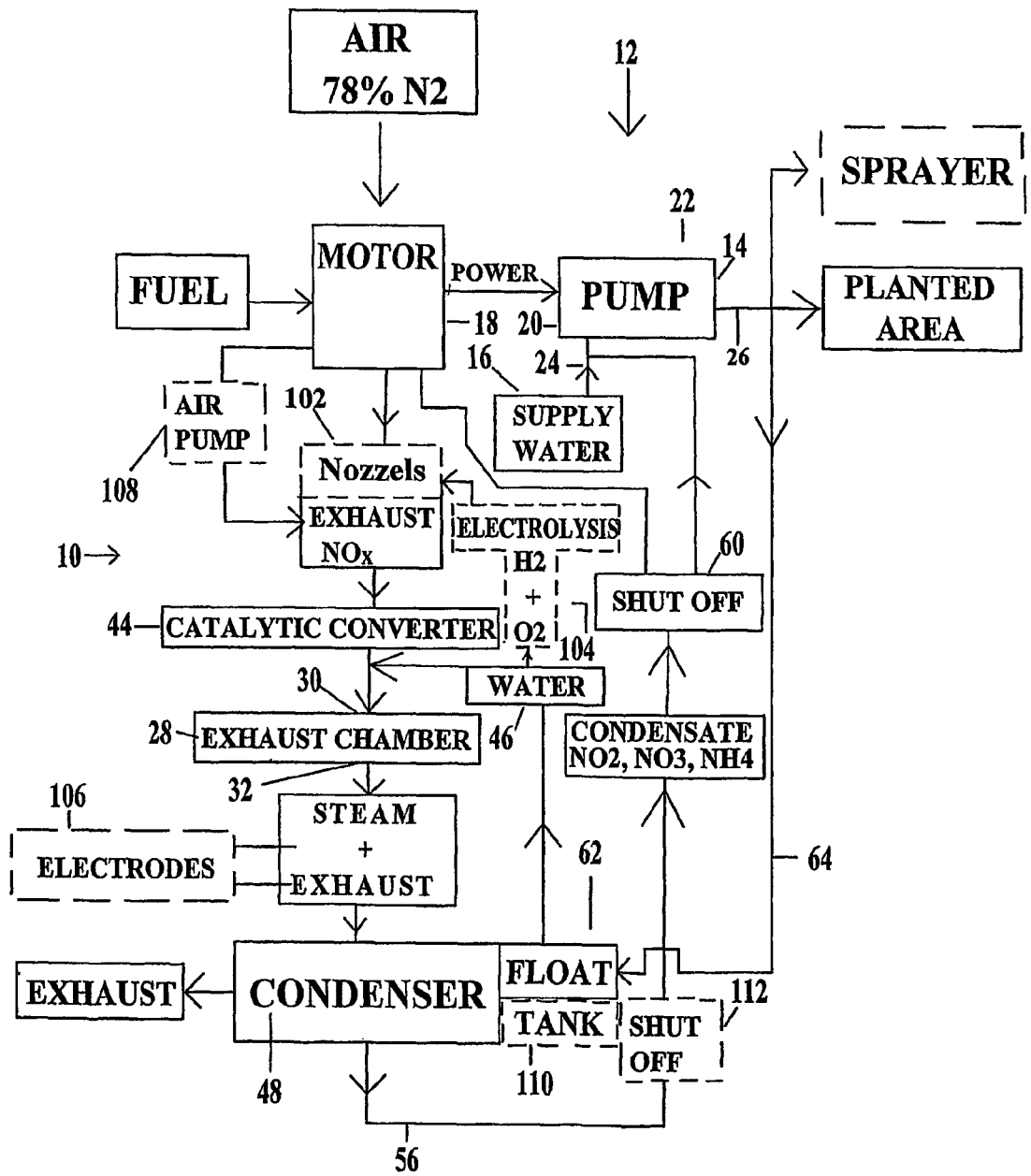
FIG. 2 is a flow chart diagram illustrating the method in which nitrogen and other plant nutrients are extracted from combustion gases in an irrigation system.

Referring to the accompanying drawings, there is illustrated a fertilizer system generally indicated by reference numeral 10. The system is particularly suited for as an extraction system for nitrogen compounds and other plant nutrients from combustion exhaust gases. The phrase "nitrogen compounds" is understood in this specification to include any nitrogen related compounds including nitrous oxide ($N_2O$), nitrite ($NO_2$), nitrate ($NO_3$), ammonium ($NH_4$) and other aqueous or non-aqueous compounds containing nitrogen which may be known to have benefits for fertilizing plants. Other nutrients extracted are sulphur, phosphorus, magnesium, zinc, iron, copper and carbon dioxide as a carbonic acid.

The system 10 includes a pump 14 for pumping water from a source 16 of water used for distributing water to crops and plants. The pump is driven by a motor 18 which typically comprises an internal combustion engine consuming commonly available fossil fuels, for example gasoline, natural gas, propane or diesel fuel and the like.

While various embodiments are described and illustrated herein, the common features of each will first be described herein. The pump 14 includes an inlet 20 and an outlet 22. The inlet is coupled to a suction line 24 in communication with the water source 16 while the outlet communicates with an outlet pressure line 26 which directs the water to a distribution system for an area to be irrigated or watered.

The fertilizer system 10 includes an exhaust chamber 28 which is similar in construction to a conventional automotive muffler in the illustrated embodiment. The exhaust chamber is a sealed chamber having an inlet opening 30 at a top end and an outlet opening 32 at a bottom end thereof. An inlet pipe 34 connects the inlet at the top of the exhaust chamber 28 in communication with the exhaust of the motor 18 of the irrigation system. The inlet pipe 34 includes a downwardly extending portion 36 which extends downwardly into the exhaust chamber 28 after an elbow 38 redirecting the inlet pipe from the motor. The exhaust chamber further includes internal baffles 40 which redirect the exhaust passing therethrough from the inlet pipe 34 to an outlet pipe 42 which is axially misaligned with the inlet pipe. As in a conventional automotive muffler the exhaust must pass through various baffles 40 and possibly through perforations in the respective inlet and outlet pipes in order to navigate through the exhaust chamber.

A catalytic converter 44 is coupled in series with the inlet pipe between the motor 18 and the exhaust chamber 28 so that exhaust gases pass through the catalytic converter prior to entering the exhaust chamber. The catalytic converter acts as a catalyst for the hot exhaust gases from the motor to react some of the compounds within the exhaust gases. The catalytic converter may be removed depending upon the desirable nitrogen compounds which are to be extracted and depending upon the particular application, the type of motor 18 and the type of fuel being consumed.

A water injector 46 is provided for injecting water into the hot exhaust gases as it enters the exhaust chamber 28. The water injector is coupled to the downwardly extending portion 36 of the inlet pipe to prevent backflow of injected water to the motor 18 of the pump. The water is sprayed into the exhaust chamber for mixing with the hot exhaust gases to be converted to steam before exiting through the outlet pipe. The water injector 46 receives water from the outlet pressure line 26 to which it is coupled so as to receive pressurized water from the pump outlet to be injected into the exhaust chamber by an injector line 64.

The outlet pipe of the exhaust chamber 28 feeds into a condensing chamber 48 where the mixture of water vapor or steam and hot exhaust gases form condensate in the form of water enriched with nitrogen compounds and other plant nutrients. The condensing chamber 48 generally comprises a barrel or drum having an inlet pipe 50 extending downwardly into the barrel at a top end thereof to which the outlet pipe of the exhaust chamber is coupled. The condensing chamber further includes an exhaust opening 52 at the top end thereof. A condenser core 54 is provided within the condensing chamber which spans the walls of the chamber between the open end of the inlet pipe 50 and the exhaust opening 52. The condenser core includes passages therethrough for circulating a cooling fluid to assist in the condensation process. In the illustrated embodiment the cooling fluid comprises water which is circulated from the outlet pressure line 26.

A collector line 56 couples to a drain 58 at a bottom end of the condensing chamber. The collector line 56 is coupled at an opposite end to the suction line 24 adjacent the inlet of the pump 14 so that condensate collected from the condensing chamber by the collector line 56 is drawn into the inlet of the pump with the irrigation water from the source 16 to be subsequently distributed by the outlet pressure line to a distribution system.

A shut-off valve 60 is coupled in series with the collector line 56 between the condensing chamber 48 and the suction line 24 to selectively interrupt flow of condensate through the collector line. The shut-off valve 60 includes a suitable controller for opening the valve 60 only when the pump motor 18 is operating so that the shut-off valve 60 is closed when the motor is not in operation to prevent leakage of condensate into the suction line.

A float valve 62 is supported within the condensing chamber 48 and is coupled in series with the injector line 64 coupling the water injector to the irrigation pressure line. The float valve is arranged to be opened only when a level of condensate within the condensing chamber falls below a prescribed level so that in the instance when the level falls below the prescribed level, the water injector 46 injects water to raise the condensate level. Once sufficient condensate collects within the condenser above the prescribed level, the float valve 62 closes to prevent further water being injected into the exhaust chamber. The float valve 62 ensures that condensate level remains above the drain 58 and corresponding collector line 56 to prevent air from being drawn into the suction line of the pump.

The fertilizer system 10 is first started by operating the pump 14 using the pump motor 18. The motor draws in intake air from the surrounding air which is approximately 78% nitrogen in the form $N_2$. The high heat of combustion in combination with the compression and ignition within the engine converts the nitrogen to useable forms of nitrogen compounds, for example nitrous oxides ($NO_x$). The hot exhaust gases exit the motor and pass into the exhaust chamber 28 at which point the water injector 46 sprays water into the hot stream of exhaust gases entering downwardly into the exhaust chamber to form steam in the exhaust chamber which absorbs and collects nitrogen compounds and other plant nutrients from the hot exhaust gases forming various nitrogen compounds in solution with the water vapor. The condensate which then forms in the condensing chamber 48 includes such compounds as $NO_2$, $NO_3$, $NH_4$, sulphur, phosphorus, magnesium, zinc, iron, copper and carbon dioxide as a carbonic acid. As noted above the water level within the condensing chamber is controlled by the float valve to inject water from the outlet pressure line as required to maintain condensate level above the prescribed level. As long as the motor of the pump remains in operation, the shut-off valve 60 remains open so that condensate from the condensing chamber is sucked through the collector line 56 into the suction line 24 of the pump to subsequently fertilize an area, upon which the enriched water is dispersed, with nitrogen compounds and plant nutrients carried by the water. By passing the exhaust through the additional catalytic converter before entering the exhaust chamber, the type or quantity of desirable nitrogen compounds can be increased in the condensate which later forms as different types of exhaust gases are converted as required depending upon the type of combustion device and the type of fuel being combusted.

The system 10 is particularly useful in combination with or as a retrofit kit for conversion of an agricultural irrigation system 12 or self propelled equipment 100 to enrich water to be fed to the plant material in association therewith while reducing harmful emissions of the engine/motor 18.

When used in an irrigation system 12, as illustrated in FIG. 1, the engine 18 comprises an existing engine of the irrigation system used to drive the existing pump 14 of the irrigation system for pumping water from a source in the form of irrigation water collected for a crop or plants to be irrigated.

Figure 3:
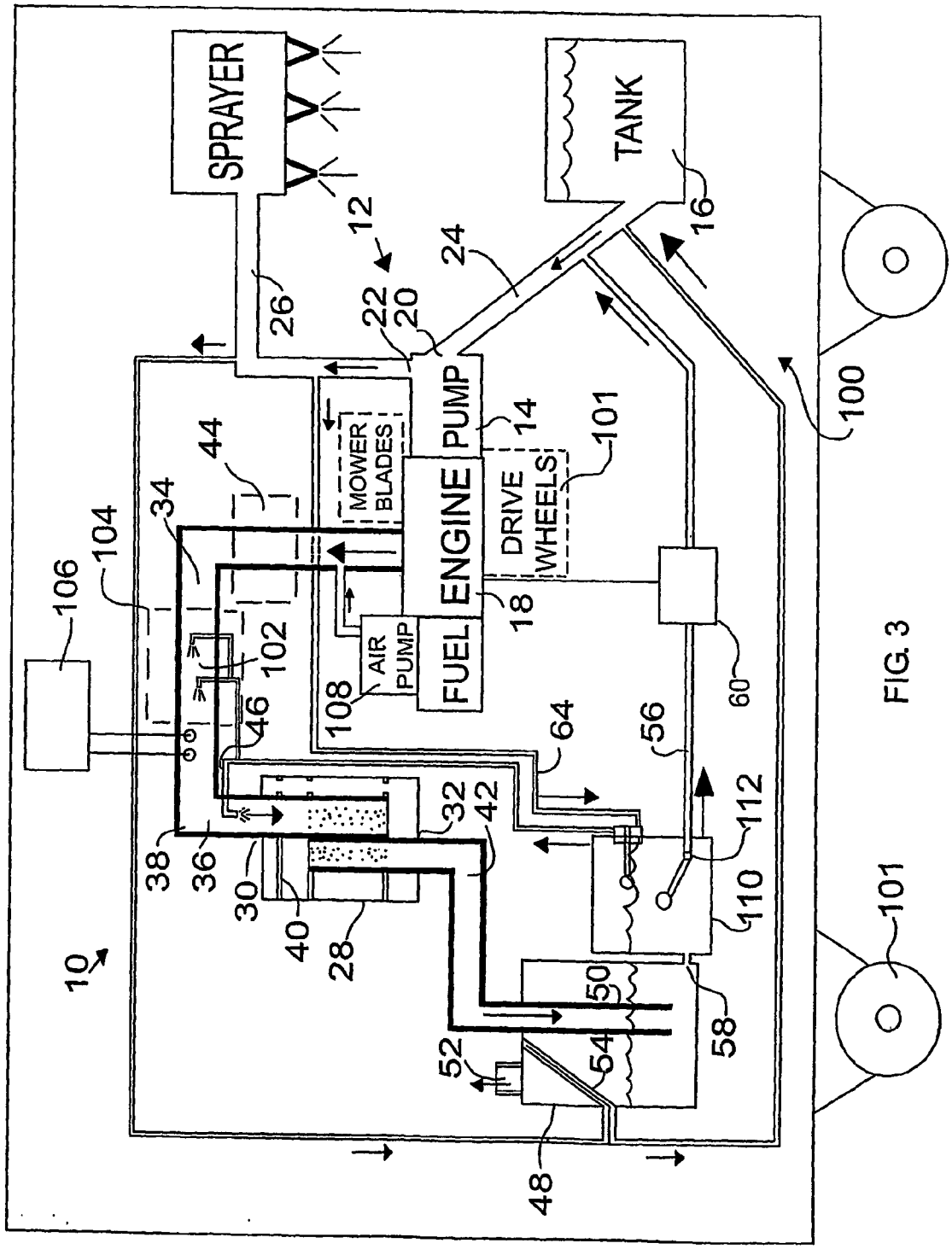
FIG. 3 is a schematic view of the fertilizer system for extraction of nitrogen compounds and other plant nutrients as it is used in plant care equipment driven by an internal combustion engine.

When used on self propelled equipment 100, as illustrated in FIG. 3, the engine 18 comprises an existing engine of the equipment for propelling or driving the equipment, for example a sprayer or mower engine, which is supported on wheels 101 for rolling movement along the ground. The source 16 of water in this instance comprises a portable tank carried by the equipment or towed by the equipment on a trailer. The destination of the enriched water is a sprayer type distribution system also carried by the equipment 100.

Turning now to FIG. 3 in greater detail, additional control systems may be included for co-operation with the components noted above with regard to common features of both embodiments. To improve efficiency of the water scrubbing by injector 46, the injector 46 may include a plurality of nozzles 102 at plural spaced positions along the exhaust passage between the engine and the exhaust chamber. The plurality of nozzles serve to inject water at plural spaced positions more evenly and more gradually to ensure more thorough mixing of the products of combustion with the water vapour produced by the heat of the exhaust. Part of the water provided to the injector 46 may also be directed to an electrolysis device 104 which produced hydrogen and oxygen by electrolysis for injection into the exhaust with the water to further aid in the conversion process of nitrous oxides to useful nitrite and nitrate compounds. A set of high voltage electrodes 106 can also be positioned within the exhaust passage extending between the engine and the exhaust chamber to produce to a corona or high voltage arc between the electrodes which provides energy to assist in desirable chemical reactions taking place to promote more favourable products of combustion. An electrical field generator may also be provided which surrounds the exhaust passage. Additional air to assist in the conversion of various nitrous oxide compounds to desirable nitrite, nitrate and ammonia is provided by an air pump 108 also driven by the engine 18.

To provide more precise control of the fluid levels within the condenser chamber, the condenser chamber may include an auxiliary chamber 110 or may simply be enlarged to house further controls therein. The auxiliary chamber 110 is coupled to the condensate chamber so that levels of condensate are maintained at the same level within each. The float valve 62 can thus be mounted in either chamber in communication with the condensate for similar operation of water passing through the injector line 64 to the injector 46 when condensate levels fall below a prescribed level. An additional float valve 112 is provided in the auxiliary chamber 110 in series with the collector line 56 where the collector line couples to the drain 58 of the condensate chamber to permit condensate to be dispensed into the collector line only when the float valve 112 is opened as a result of condensate levels within the condensate and auxiliary chambers being above a prescribed level. This configuration ensures that in the event of a lack of condensate for whatever reason, the collector line will not draw air into the pump if the pump is permitted to continue operating by the engine 18.

The system 10 operates on the equipment 100 in a similar manner of operation as the irrigation system by drawing water from a tank carried on the equipment through the pump to a distribution system of the equipment which may comprise sprayer nozzles and the like for dispensing the water onto a field or planted area. The pump is driven by an existing engine 18 of the equipment, for example the engine driving the mower blades or propelling a mower or sprayer for movement across the ground. Water is re-circulated and mixed with the exhaust gases in the manner described above so that desirable nutrients in the form of nitrite, nitrate and ammonium, sulphur, phosphorus, magnesium, zinc, iron, copper and carbon dioxide as a carbonic acid are dispensed to the planted area while harmful emissions in the exhaust gases are reduced.

In an irrigation system the source of water may comprise a lagoon or the like which feeds water through the system as described above for subsequently being dispersed to the irrigation area. The engine 18 in this instance preferably comprises an existing engine driving the irrigation pump of the irrigation system. In either instance the fertilizer system is preferably operated to run continuously while the engine is running with all of the condensate being fully diverted into the water to be dispersed over the planted area. Only water is preferably added, with air being optionally added to the existing products of combustion of the internal combustion engine 18 to provide a system which is simple to operate which obtains benefits from otherwise harmful and useless products of combustion.

Further benefits of the use of water injected into an exhaust chamber as described above include the pre-heating of irrigation water and control of emission gases from the combustion device. The addition of water to the exhaust gases is beneficial to the environment because the interaction of water with the hot exhaust gases causes some undesirable emissions to be converted to less harmful compounds that are less damaging to the environment and because the system requires no additional energy consumption other than the use of equipment which would otherwise already be in operation.

When the water injected into the exhaust chamber comprises irrigation water which is returned to the irrigation pump, the exhaust chamber acts as a heat exchanger to recover waste heat from the exhaust gases to preheat the irrigation water. Preheating the irrigation water is of benefit so that cold source water, for example from a river, provides less thermal shock to irrigated plants which would normally be warmer than the source water.

While some embodiments of the present invention have been described in the foregoing, it is to be understood that other embodiments are possible within the scope of the invention. The invention is to be considered limited solely by the scope of the appended claims.

The invention claimed is:

1. A fertilizer system for extracting nitrogen compounds and other plant nutrients from exhaust gases of a combustion device, the system comprising:
   an exhaust chamber having an inlet and an outlet and being arranged for receiving the exhaust gases from the combustion device therethrough;
   a catalytic converter coupled to an inlet of the exhaust chamber and being arranged for receiving the exhaust gases therethrough prior to the exhaust chamber;
   a water injector arranged for injecting water into the exhaust chamber such that the water mixes with the exhaust gases to form a water vapor;
   an air pump arranged for injecting air into the exhaust gases near the water injector;
   a condensing chamber;
   an outlet pipe arranged to direct the water vapor and the exhaust gases from the exhaust chamber to the condensing chamber;
   the condensing chamber being arranged for condensing said water vapor exiting the exhaust chamber with the exhaust gases to form a condensate solution; and
   a collector arranged for collecting said condensate solution from the condensing chamber.

2. The system according to claim 1 wherein there is provided a distribution system for distributing the condensate solution to a planted area.

3. The system according to claim 2 wherein the condensate solution is fully diverted to the distribution system.

4. The system according to claim 2 wherein the condensate solution is continuously diverted to the distribution system.

5. The system according to claim 1 wherein the exhaust chamber is arranged such that only water is added to the exhaust gases to form the condensate solution.

6. The system according to claim 1 wherein the combustion device comprises an internal combustion engine.

7. The system according to claim 1 in combination with mobile device supported on wheels for rolling movement along the ground wherein the combustion device comprises an engine arranged for propelling the mobile device.

8. The system according to claim 7 wherein the mobile device comprises a mower.

9. A fertilizer system in combination with an irrigation system for extracting nitrogen compounds and other plant nutrients from exhaust gases; the irrigation system comprising: an irrigation pump arranged to pump water from a water source to an area to be irrigated, the irrigation pump including an inlet arranged to communicate with the water source and an outlet arranged to communicate with a distribution system of the area to be irrigated; and an internal combustion engine arranged for driving the pump and being arranged to produce exhaust gases; the fertilizer system comprising:
   an exhaust chamber having an inlet and an outlet and being arranged for receiving the exhaust gases from the internal combustion engine therethrough;
   a water injector arranged to receive water from the outlet of the pump and to inject the water into the exhaust chamber such that the water mixes with the exhaust gases to form a water vapor;

a condensing chamber arranged to condense said water vapor exiting the exhaust chamber with the exhaust gases to form a condensate solution; and a collector arranged to collect said condensate solution from the condensing chamber;

the collector being coupled to communicate with the inlet of the irrigation pump so as to be arranged for dispensing the condensate solution into irrigation water pumped through the irrigation pump.

10. The system according to claim 9 wherein the water injector is coupled to the outlet of the irrigation pump such that the water injected into the exhaust chamber comprises only a portion of the water pumped by the irrigation pump.

11. The system according to claim 9 wherein the condensing chamber includes a condenser core which is cooled by irrigation water pumped by the irrigation pump passing therethrough.

12. The system according to claim 9 wherein there is provided a shut-off valve coupled in series between the collector and the inlet of the irrigation pump which is arranged to be open responsive to operation of the internal combustion engine.

13. The system according to claim 9 wherein the water injector includes a control valve coupled in series therewith between the outlet of the irrigation pump and the water injector, the control valve being arranged to inject water into the exhaust chamber in response to a level of condensate in the condensing chamber falling below a prescribed level of condensate.

14. The system according to claim 9 wherein there is provided a catalytic converter coupled to an inlet of the exhaust chamber arranged for receiving the exhaust gases therethrough prior to the exhaust chamber.

15. The system according to claim 9 wherein there is provided an air pump arranged for injecting air into the exhaust gases near the water injector.

16. The system according to claim 1 wherein there is provided high voltage arc means arranged for generating an electric arc in a passage through which the exhaust gases pass.

17. The system according to claim 1 wherein there is provided an electrical field generator surrounding a passage through which the exhaust gases pass.

18. The system according to claim 1 wherein a portion of water from the injector is diverted to an electrolysis device before injection into the exhaust gases for injecting hydrogen and oxygen into the exhaust gases.

19. The system according to claim 1 wherein the condensate solution includes nitrite, nitrate, ammonium, sulphur, phosphorus, magnesium, zinc, iron, copper and carbon dioxide as a carbonic acid.

20. A method of fertilizing by extracting nitrogen compounds and other plant nutrients from exhaust gases of a combustion device, the method comprising:

operating a combustion device to produce exhaust gases;

directing the exhaust gases through an exhaust chamber in communication with the combustion device;

injecting water into the exhaust chamber such that the water mixes with the exhaust gases to form a water vapor prior to exiting the exhaust chamber;

directing the water vapor and the exhaust gases from the exhaust chamber to a condenser;

condensing said water vapor exiting the exhaust chamber with the exhaust gases in the condenser to form a condensate solution; and distributing said condensate solution from the condensing chamber to an area to be fertilized.

21. The method according to claim 20 wherein the condensate solution includes nitrate, nitrite, ammonium, sulphur, phosphorus, magnesium, zinc, iron, copper and carbon dioxide as a carbonic acid.

22. The method according to claim 20 wherein the combustion device comprises a motor of an irrigation pump of an agricultural irrigation system and wherein the method includes dispensing condensate from the condensing chamber into irrigation water being pumped through the irrigation pump.

23. The method according to claim 22 wherein injecting water into the exhaust chamber comprises directing a portion of the irrigation water being pumped through the irrigation pump into the exhaust chamber.

24. The method according to claim 20 including fully diverting the condensate solution for distribution to a designated planted area.

25. The method according to claim 20 including only adding water to the exhaust gases to form the condensate solution.

26. A fertilizer system in combination with a mobile device supported on wheels for rolling movement along the ground and including an internal combustion engine arranged for propelling the mobile device, the fertilizer system being arranged to extract nitrogen compounds and other plant nutrients from exhaust gases of the internal combustion engine, the fertilizer system comprising:

a source of water arranged to be supported on the mobile device;

an exhaust chamber having an inlet and an outlet and being arranged for receiving the exhaust gases from the combustion device therethrough;

a water injector arranged for injecting water from the source of water into the exhaust chamber such that the water mixes with the exhaust gases to form a water vapor;

a condensing chamber arranged for condensing said water vapor exiting the exhaust chamber with the exhaust gases to form a condensate solution; and a distribution system arranged for collecting said condensate solution from the condensing chamber and dispensing the condensate solution onto the ground.

* * * * *